US012319546B2

(12) United States Patent
Shimizu et al.

(10) Patent No.: US 12,319,546 B2
(45) Date of Patent: Jun. 3, 2025

(54) TELESCOPIC BOOM

(71) Applicant: TADANO LTD., Kagawa (JP)

(72) Inventors: Kenji Shimizu, Kagawa (JP); Kazuhiro Kobayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 256 days.

(21) Appl. No.: 17/928,108

(22) PCT Filed: Jun. 7, 2021

(86) PCT No.: PCT/JP2021/021572

§ 371 (c)(1),
(2) Date: Nov. 28, 2022

(87) PCT Pub. No.: WO2021/251338

PCT Pub. Date: Dec. 16, 2021

(65) Prior Publication Data

US 2023/0211985 A1 Jul. 6, 2023

(30) Foreign Application Priority Data

Jun. 8, 2020 (JP) ................................ 2020-099619
Jun. 7, 2021 (JP) ................................ 2021-095041

(51) Int. Cl.
*B66C 23/70* (2006.01)

(52) U.S. Cl.
CPC .......... *B66C 23/707* (2013.01); *B66C 23/705* (2013.01)

(58) Field of Classification Search
CPC .... B66C 23/705; B66C 23/707; B66C 23/708
See application file for complete search history.

(56) References Cited

U.S. PATENT DOCUMENTS 6,206,213 B1 3/2001 Conrad
9,688,519 B2 * 6/2017 Kawabuchi ........... B66C 23/705
(Continued)

FOREIGN PATENT DOCUMENTS

DE 298 24 867 U1 3/2003
DE 20 2014 002 187 U1 6/2014
(Continued)

OTHER PUBLICATIONS

DE 202014002187 U1 Machine Translation. (Year: 2014).*
(Continued)

*Primary Examiner* — Emmanuel M Marcelo
*Assistant Examiner* — Juan J Campos, Jr.
(74) *Attorney, Agent, or Firm* — MARSHALL, GERSTEIN & BORUN LLP

(57) ABSTRACT

A lightweight and high-rigidity telescopic boom in which strain during manufacturing is suppressed is disclosed. In a telescopic boom, a plurality of booms forms a telescope structure, and the telescopic boom includes a boom fixing mechanism that fixes a top boom disposed relatively inside at a predetermined position with respect to a first intermediate boom disposed relatively outside. The boom fixing mechanism includes a boom fixing pin that is provided to the top boom and advances and retreats with respect to the first intermediate boom, a fixing boss that is provided to the first intermediate boom and into which the boom fixing pin is inserted and extracted, and a gap maintaining member that is provided to the fixing boss and protrudes outward to maintain a gap between the first intermediate boom and a second intermediate boom disposed further outside.

7 Claims, 10 Drawing Sheets

(56) References Cited

U.S. PATENT DOCUMENTS

| | | | | |
|---|---|---|---|---|
| 9,738,498 | B2 * | 8/2017 | Kawabuchi | B66C 23/705 |
| 2012/0074089 | A1 * | 3/2012 | Willim | B66C 23/708 212/348 |
| 2016/0221803 | A1 * | 8/2016 | Kawabuchi | B66C 23/705 |
| 2016/0244306 | A1 * | 8/2016 | Kawabuchi | B66C 23/22 |
| 2020/0198942 | A1 * | 6/2020 | Maini | B66C 23/708 |

FOREIGN PATENT DOCUMENTS

| | | | |
|---|---|---|---|
| EP | 3 053 869 | A1 | 8/2016 |
| JP | S53-32548 | A | 3/1978 |
| JP | H08157194 | A | 6/1996 |
| JP | 2008030934 | A | 2/2008 |
| JP | 4709415 | B2 | 6/2011 |
| JP | 2011207598 | A | 10/2011 |
| JP | 2016155654 | A | 9/2016 |
| JP | 2018080020 | A | 5/2018 |
| JP | 2018104121 | A | 7/2018 |

OTHER PUBLICATIONS

JPS-5332548A Machine Translation. (Year: 1978).*
JPH-08157194A Machine Translation. (Year: 1996).*
Extended European Search Report issued in EP Application No. 21821923.6, issued May 2, 2024.
Search Report and Written Opinion issued in International Application No. PCT/JP2021/02157, dated Aug. 31, 2021.

* cited by examiner (A)

(B)

TELESCOPIC BOOM

TECHNICAL FIELD

The present invention relates to a structure of a telescopic boom mounted on a mobile crane.

BACKGROUND ART

A mobile crane such as a rough terrain crane generally includes a telescopic boom forming a telescopic structure. In the telescopic boom, a plurality of booms is assembled in a so-called nested manner, and an inner boom having a smaller outer shape is inserted into the inside of an outer boom having a larger outer shape. A predetermined gap is set between the two booms, and when the telescopic boom extends and retracts, the inner boom slides relatively with respect to the outer boom and protrudes from the outer boom.

Japanese Patent No. 4709415 discloses a coupling structure that couples the inner boom with the outer boom adjacent to the inner boom. In the coupling structure, a boom fixing pin provided to the inner boom is fitted to a fixing boss attached to the outer boom. Specifically, the boom fixing pin is inserted into a fixing hole provided to the fixing boss, thereby the inner boom and the outer boom are coupled. With this, the inner boom and the outer boom slide integrally. The boom fixing pin is extracted from the fixing hole, thereby the coupling between the inner boom and the outer boom is released.

The telescopic boom disclosed in Japanese Patent Application Laid-Open No. 2018-80020 includes a slide plate between the inner boom and the outer boom. When the inner boom is relatively displaced with respect to the outer boom, the slide plate contacts the adjacent booms. With this, the predetermined gap is maintained, and an outer surface of the inner boom and an inner surface of the outer boom are prevented from directly contacting.

Incidentally, each boom constituting the telescopic boom is obtained by forming a steel plate into a tubular shape, and is required to be lightweight and high-rigidity. Therefore, each boom is designed to have a thin thickness and a large outer size (so as to have a thin and large cross section). That is, the telescopic boom is designed compactly so that the outer size of each boom is large and the gap between the booms is small. On the other hand, the fixing boss and the slide plate are provided to each boom constituting the telescopic boom, and are generally welded from the point of view on strength and mounting method.

When the fixing boss or the like is welded to a thin steel plate, strain is likely to occur in each boom. When the strain occurs, the predetermined gap is not secured. As a result, not only it becomes difficult to assemble each boom, but also in the first place, the design of each boom does not meet the above-described requirements, and a serious problem occurs in manufacturing the telescopic boom.

SUMMARY OF THE DISCLOSURE

The present invention has been made in this background, and an object thereof is to provide a lightweight and high-rigidity telescopic boom in which strain during manufacturing is suppressed.

(1) In a telescopic boom according to the present invention, a plurality of booms forms a telescopic structure, and the telescopic boom includes a boom fixing mechanism configured to fix the boom disposed relatively inside at a predetermined position with respect to the boom disposed relatively outside. The boom fixing mechanism includes a boom fixing pin provided to the boom disposed inside and configured to advance and retreat with respect to the boom disposed outside, a fixing boss provided to the boom disposed outside and configured to allow the boom fixing pin to be inserted and extracted, and a gap maintaining member provided to the fixing boss and configured to protrude outward to maintain a gap between the boom disposed outside and the boom disposed further outside.

According to this configuration, the gap maintaining member is not directly welded to the boom, but is provided to the fixing boss. Therefore, an amount of welding to the boom is decreased, and as a result, welding strain generated at the time of manufacturing the boom is suppressed. With this, a design in which the thickness of the boom is thinner and the gap between the booms is smaller becomes possible, and a compact design and a lightweight design of the telescopic boom becomes possible. Furthermore, compared with a case in which the fixing boss and the gap maintaining member are separately welded to the boom, a space saving of the gap between the booms can be realized, and an optimal design of the boom becomes possible. Furthermore, the gap maintaining member is provided to the fixing boss, thereby the gap maintaining member is disposed in a vicinity of a portion in which the boom fixing pin is extracted and inserted. Therefore, the gap between the adjacent booms is reliably maintained in a region in which the boom fixing pin operates.

(2) The fixing boss includes a central plate portion having a rectangular shape extending in a longitudinal direction and a vertical direction of the boom, the central plate portion configured to allow the boom fixing pin to be inserted and extracted, a pair of lateral bulging portions that is respectively continuous with both sides in the longitudinal direction of the central plate portion and smoothly bulges outward, and a vertical bulging portion that smoothly bulges in a continuous manner with at least one of an upper end or a lower end of the central plate portion. The gap maintaining member is provided to the vertical bulging portion so as to protrude to a side of the boom disposed relatively outside.

In this configuration, the lateral bulging portions are smoothly continuous with the both sides of the central plate portion disposed in a relatively central portion, and the vertical bulging portion is smoothly continuous with an upper portion of the central plate portion. In other words, the fixing boss is a flat plate shaped member, and an outer peripheral edge thereof draws a smooth closed curve. Therefore, since when an external force acts on the fixing boss, stress concentration on a specific portion is relieved, the fixing boss can secure a sufficient mechanical strength, and a lightweight design is also possible.

Furthermore, the gap maintaining member is provided to the vertical bulging portion. Therefore, when the gap maintaining member contacts the adjacent boom (boom disposed further outside), an influence of an impact or the like at the time of the contact on the central plate portion or the lateral bulging portion of the fixing boss can be reduced.

(3) It is preferable that the fixing boss include a central plate portion having a rectangular shape extending in a longitudinal direction and a vertical direction of the boom, the central plate portion configured to allow the boom fixing pin to be inserted and extracted, and a pair of lateral bulging portions that is respectively continuous with both sides in the longitudinal direction of the central plate portion and symmetrically bulges outward, and the gap maintaining member is provided to the central plate portion or the lateral bulging portion and has a rectangular parallelepiped shape protruding to a side of the boom disposed relatively outside.

In this configuration, the lateral bulging portions are smoothly continuous with the both sides of the central plate portion disposed in a relatively central portion. In other words, the fixing boss is a flat plate shaped member, and an outer peripheral edge thereof draws a smooth closed curve. Therefore, since when an external force acts on the fixing boss, stress concentration on a specific portion is relieved, the fixing boss can secure a sufficient mechanical strength. In addition, the shape of the fixing boss is simple, and a further lightweight design is possible.

(4) It is preferable that the gap maintaining member be attachably and detachably provided to the fixing boss by a fastening member.

According to this configuration, the gap maintaining member is easily replaced as a consumption article.

(5) Hardness of the gap maintaining member is lower than hardness of the boom.

According to this configuration, since when the gap maintaining member contacts the boom, the gap maintaining member having lower hardness is worn, the boom is prevented from being worn.

(6) Preferably, the boom is made of steel material, and the gap maintaining member is made of copper alloy.

(7) The gap maintaining member may be welded to the fixing boss.

According to this configuration, the gap maintaining member can be strongly attached to the fixing boss.

According to the present invention, a lightweight and high-rigidity telescopic boom in which strain during manufacturing is suppressed is provided.

DETAILED DESCRIPTION

Hereinafter, a preferred embodiment of the present invention will be described with reference to the drawings as appropriate. Note that it is needless to say that the present embodiment is merely one aspect of a telescopic boom according to the present invention, and that the embodiment may be changed without departing from the gist of the present invention.

Figure 1:
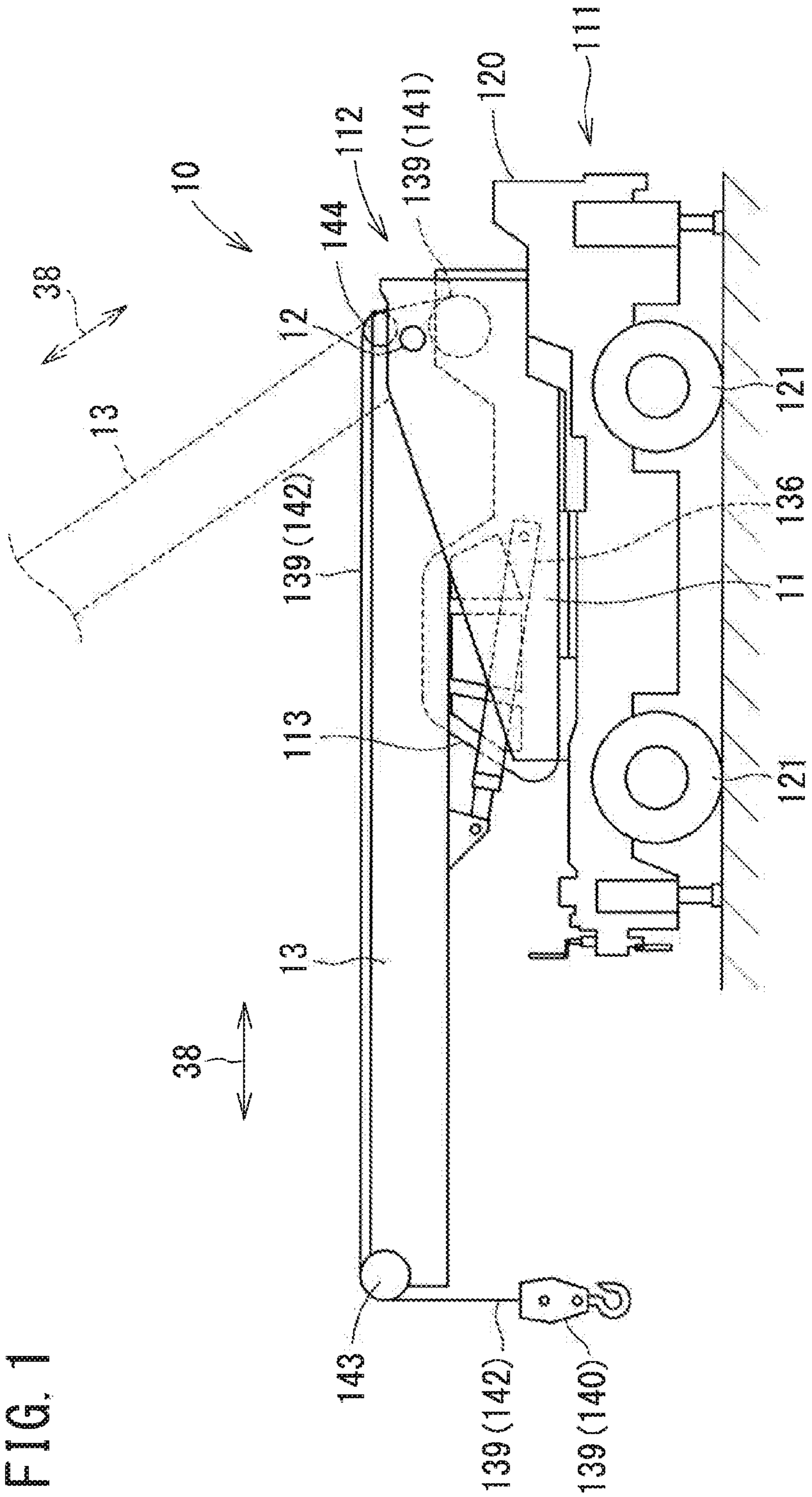
FIG. 1 is a left side view of a mobile crane in which a telescopic boom according to an embodiment of the present invention is adopted.

FIG. 1 is a left side view of a mobile crane 10 in which a telescopic boom 13 according to an embodiment of the present invention is adopted.

As shown in FIG. 1, the crane 10 includes a carrier 111, a boom device 112, a cabin 113, and a winch 139.

The carrier 111 includes a vehicle body 120 and wheels 121. The vehicle body 120 has axles not shown, and the axles are disposed at a front portion and a rear portion of the vehicle body 120. The wheels 121 are provided at both ends of each axle. The axles and the wheels 121 are driven to rotate by an engine (not shown), thereby the carrier 111 travels.

The boom device 112 includes a slewing base 11, a slewing motor (not shown), the telescopic boom 13, and a derricking cylinder 136.

The slewing base 11 is supported by the vehicle body 120. The slewing base is supported so as to be rotatable around a slewing shaft extending in the vertical direction. The slewing base 11 is rotated by the slewing motor. The telescopic boom 13 is supported by the slewing base 11. The telescopic boom 13 can slew together with the slewing base 11.

The telescopic boom 13 stands up and lies down between a lying position and a standing position taking a derricking central shaft 12 as a center, by an extension and a retraction of the derricking cylinder 136. The derricking central shaft 12 extends in a width direction 102 (see FIG. 2: direction orthogonal to the paper surface in FIG. 1). FIG. 1 shows the telescopic boom 13 in the lying position by a solid line and shows the telescopic boom 13 in the standing position by a broken line.

Figure 2:
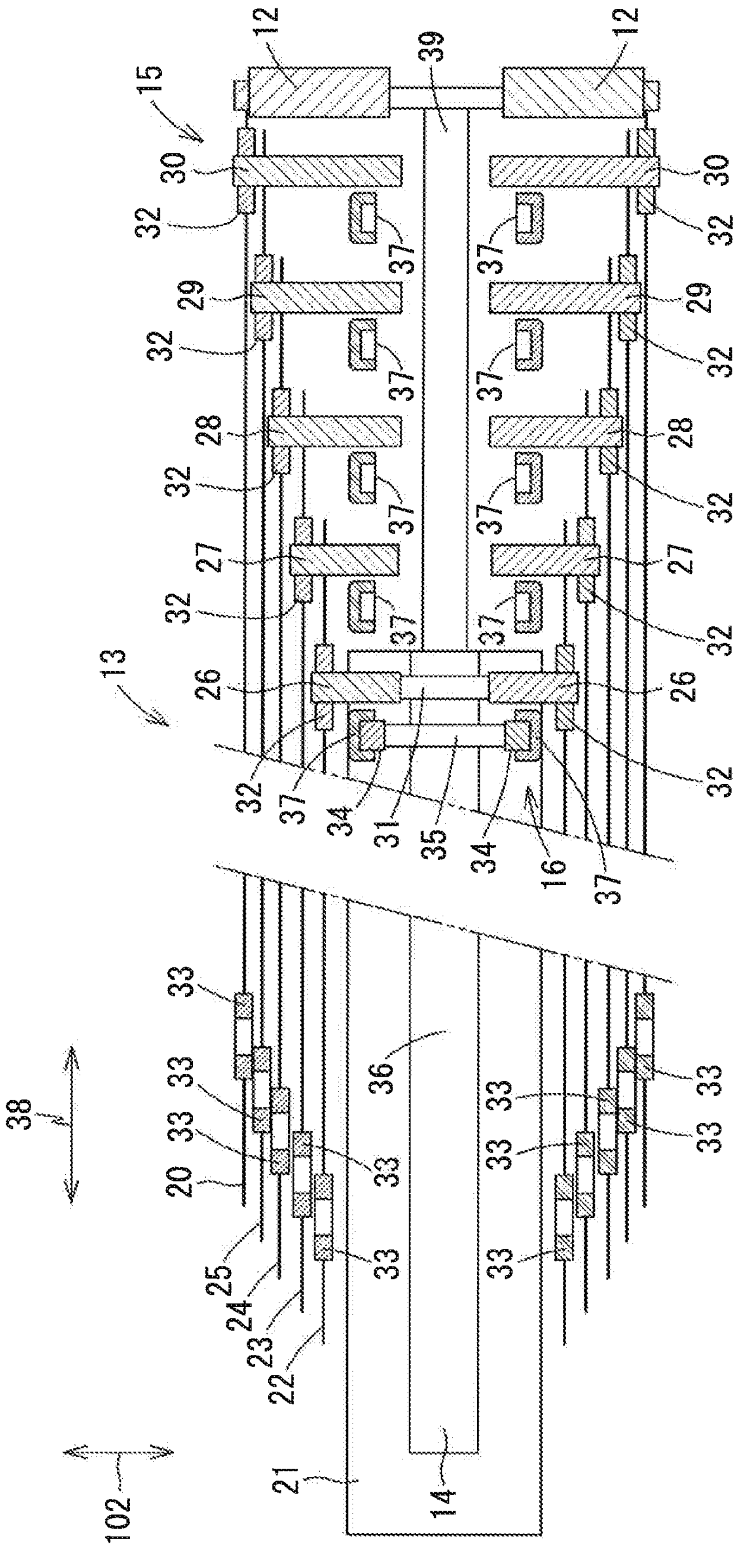
FIG. 2 is a schematic cross-sectional view showing a structure of the telescopic boom according to the embodiment of the present invention.

As shown in FIG. 2, the telescopic boom 13 includes a plurality of cylindrical booms (a base boom 20, a top boom 21, and intermediate booms 22 to 25 to be described later), and these booms form a telescopic structure. Each of the booms 20 to 25 is made of steel material, for example. The configuration of the telescopic boom 13 will be described in detail later.

The cabin 113 is mounted on the slewing base 11. The cabin 113 has a seat on which an operator sits, a driving device used for driving the carrier 111, and a steering device used for steering the boom device 112. The crane 10 is a so-called rough terrain crane, and the operator performs driving of the carrier 111 and steering of the boom device 112 in one cabin 113. However, the crane 10 may be an all-terrain crane including two cabins, that is, a cabin having the driving device and a cabin having the steering device. The driving device has a steering for steering the wheels 121, an accelerator pedal, a brake pedal, a shift lever, or the like. The operator makes the carrier 111 travel using the driving device. The steering device has a plurality of levers or the like for driving the slewing motor, a telescopic cylinder, the derricking cylinder 136, a winch motor (not shown), or the like. The operator operates the boom device 112 using the steering device.

The winch 139 includes a drum 141 driven to rotate, a wire rope 142, and a hanging hook 140. The drum 141 is rotatably supported by the slewing base 11.

The drum 141 is rotated by the winch motor. The wire rope 142 is wound around the drum 141, and is fed out from the drum 141 or wound around the drum 141 by the rotation of the drum 141. The hanging hook 140 is connected to the wire rope 142.

The wire rope 142 is wound from the drum 141 to a wire sheave 144 provided at a proximal end portion of the telescopic boom 13, and spans along the telescopic boom 13. The wire rope 142 is wound around a wire sheave 143 provided at a distal end portion of the telescopic boom 13 and drops down.

The hanging hook 140 is coupled to a distal end of the wire rope 142. The hanging hook 140 is hanged down by the wire rope 142 from the distal end portion of the telescopic boom 13. The hanging hook 140 rises and falls by the rotation of the drum 141.

FIG. 2 is a schematic view showing a structure of the telescopic boom 13.

In addition to the slewing base 11, the slewing motor, the telescopic boom 13, and the derricking cylinder 136, the boom device 112 includes a telescopic cylinder 14, a boom fixing mechanism 15, and a cylinder boom coupling mechanism 16, and a driving mechanism (not shown), as shown in the drawing.

The telescopic cylinder 14 makes the telescopic boom 13 extend and retract. The boom fixing mechanism 15 couples adjacent booms of the plurality of booms constituting the telescopic boom 13. The cylinder boom coupling mechanism 16 couples the telescopic cylinder 14 to a predetermined portion of the telescopic boom 13. The driving mechanism drives the boom fixing mechanism 15 and the cylinder boom coupling mechanism 16. Note that since a known configuration can be adopted for the driving mechanism, detailed description thereof is omitted.

The telescopic boom 13 includes the base boom 20, the top boom 21, and the four intermediate booms 22 to 25 disposed between the base boom 20 and the top boom 21. The intermediate booms 22 to 25 are referred to as a first intermediate boom 22, a second intermediate boom 23, a third intermediate boom 24, and a fourth intermediate boom 25 in this order from the boom adjacent to the top boom 21. That is, the telescopic boom 13 has a six-stage arrangement in the present embodiment. Each of the booms 21 to 25 is assembled so as to slide with respect to the base boom 20 in a longitudinal direction 38.

The telescopic boom 13 forms a telescopic structure. That is, the fourth intermediate boom 25 is disposed in the base boom 20 and is slidable with respect to the base boom 20. The third intermediate boom 24 is disposed in the fourth intermediate boom 25 and is slidable with respect to the fourth intermediate boom 25. The second intermediate boom 23 is disposed in the third intermediate boom 24 and is slidable with respect to the third intermediate boom 24. The first intermediate boom 22 is disposed in the second intermediate boom 23 and is slidable with respect to the second intermediate boom 23. The top boom 21 is disposed in the first intermediate boom 22 and is slidable with respect to the first intermediate boom 22.

Note that the telescopic boom 13 may not necessarily have the six-stage arrangement, and the number of the intermediate booms is not particularly limited.

The telescopic cylinder 14 is built in the telescopic boom 13. The telescopic cylinder 14 is a hydraulic type double-acting cylinder. A distal end portion of a cylinder rod 39 is coupled to a proximal end of the base boom 20. The telescopic cylinder 14 is disposed along the longitudinal direction 38 of the telescopic boom 13, and a cylinder tube 36 is disposed inside the top boom 21 in the state of FIG. 2. The telescopic cylinder 14 performs extension and retraction operation, thereby the telescopic boom 13 extends and retracts as will be described later.

FIG. 2 shows that the telescopic boom 13 is in a fully retracted state. In this state, the booms adjacent to each other are always coupled by the boom fixing mechanism 15.

Figure 3:
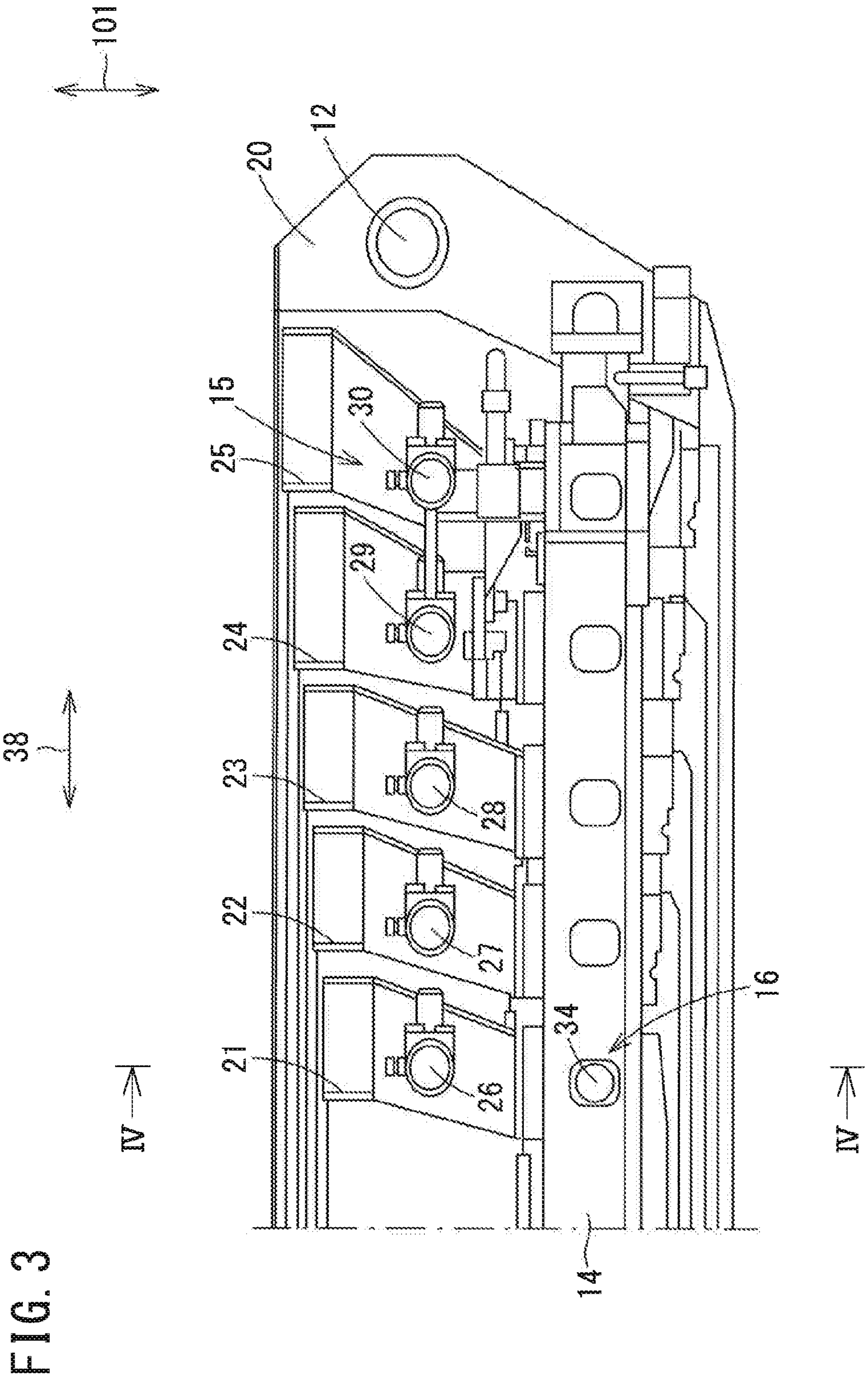
FIG. 3 is a longitudinal sectional view of the telescopic boom according to the embodiment of the present invention.
Figure 4:
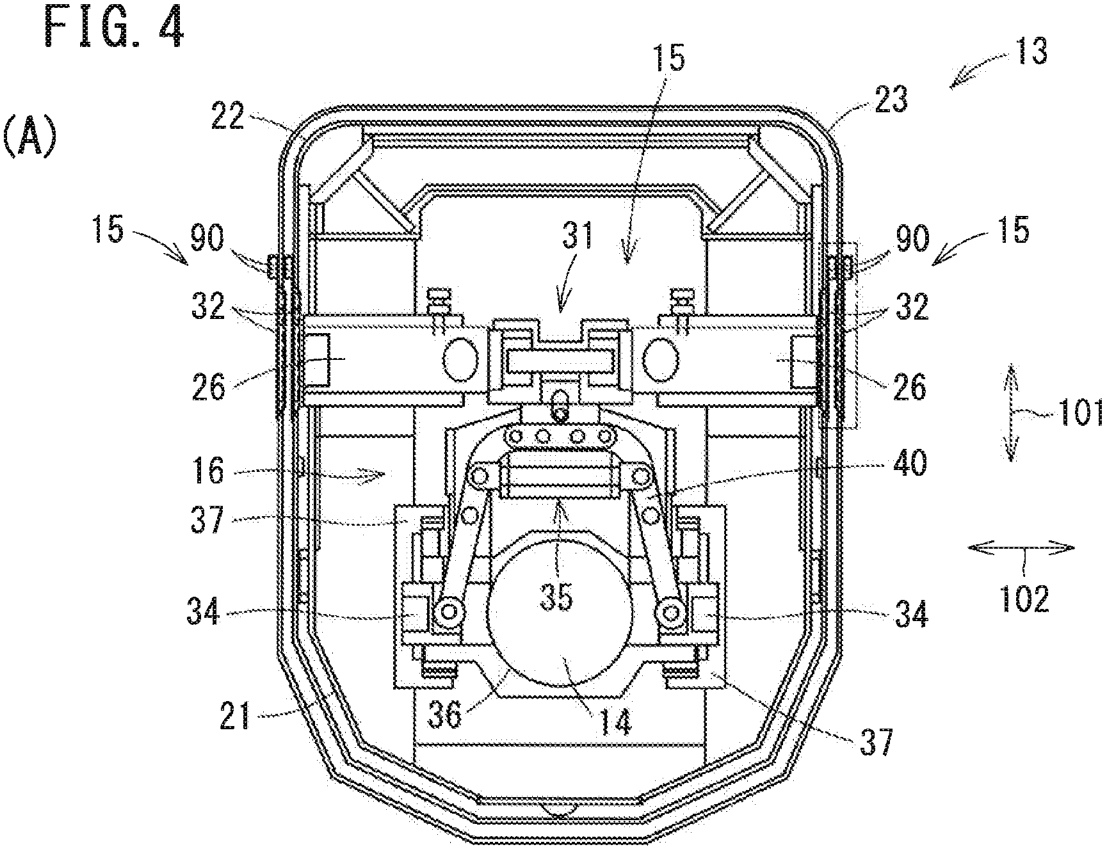
FIG. 4 is a transverse sectional view of the telescopic boom according to the embodiment of the present invention.
Figure 4:
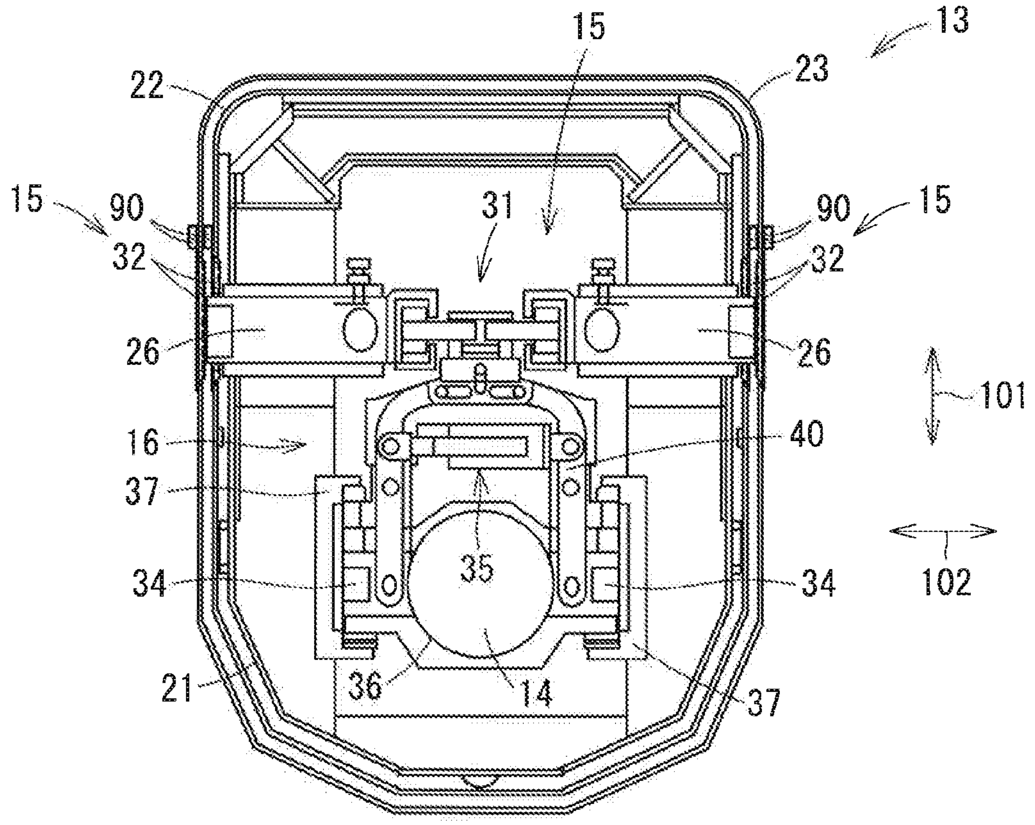

FIGS. 3 and 4 are a longitudinal sectional view and a transverse sectional view of the telescopic boom 13, respectively, and FIG. 4 is a sectional view taken along the IV-IV surface in FIG. 3. These drawings schematically show structures of the boom fixing mechanism 15 and the cylinder boom coupling mechanism 16. Note that in FIG. 4, only the top boom 21, the first intermediate boom 22, and the second intermediate boom 23 are illustrated, and illustration of the third intermediate boom 24, the fourth intermediate boom 25, and the base boom 20 is omitted.

As shown in FIGS. 2, 3, and 4, the boom fixing mechanism 15 includes five boom fixing pins (hereinafter referred to as "B pins") 26 to 30, a hydraulic cylinder 31 that drives the B pins 26 to 30, and fixing bosses 32, 33. The B pins 26 to 30 penetrate the fixing bosses 32, 33. Note that in FIG. 1, illustration of the fixing bosses 32, 33 is omitted.

As shown in FIG. 2, the B pin 26 is supported by the top boom 21. The B pins 27 to 30 are supported by the first intermediate boom 22, the second intermediate boom 23, the third intermediate boom 24, and the fourth intermediate boom 25, respectively. Note that the base boom 20 located outermost does not include the B pins.

The B pin 26 advances and retreats with respect to the boom (boom disposed outside) adjacent to the outside of the boom (boom disposed inside) that supports the B pin 26, thereby penetrating the boom disposed outside or being separated from the boom disposed outside. The same applies to the B pins 27 to 30. The B pin 26 penetrates the first intermediate boom 22, thereby fixing the top boom 21 at a predetermined position of the first intermediate boom 22. Similarly, the B pins 27 to 30 respectively penetrate the boom disposed relatively outside (the second intermediate boom 23, the third intermediate boom 24, the fourth intermediate boom 25, and the base boom 20), thereby fixing the boom disposed outside at a predetermined position of the boom disposed relatively inside (the first intermediate boom 22, the second intermediate boom 23, the third intermediate boom 24, and the fourth intermediate boom 25). At all times, the B pins 26 to 30 are biased by springs (not shown) toward a side of the boom disposed relatively outside.

The B pins 26 to 30 penetrate proximal end portions and distal end portions of the booms disposed relatively outside (the first intermediate boom 22, the second intermediate boom 23, the third intermediate boom 24, the fourth intermediate boom 25, and the base boom 20). The fixing bosses 32, 33 are provided at regions through which the B pins 26 to 30 penetrate. The B pins 26 to 30 respectively penetrate the fixing bosses 32, 33 provided to the first intermediate boom 22, the fixing bosses 32, 33 provided to the second intermediate boom 23, the fixing bosses 32, 33 provided to the third intermediate boom 24, the fixing bosses 32, 33 provided to the fourth intermediate boom 25, and the fixing bosses 32, 33 provided to the base boom 20. Note that the top boom 21 located innermost does not include the fixing bosses 32, 33.

Hereinafter, a structure of the fixing boss 32 will be described. Note that since the fixing boss 33 has the same structure as that of the fixing boss 32, description of the structure of the fixing boss 33 is omitted.

Figure 5:
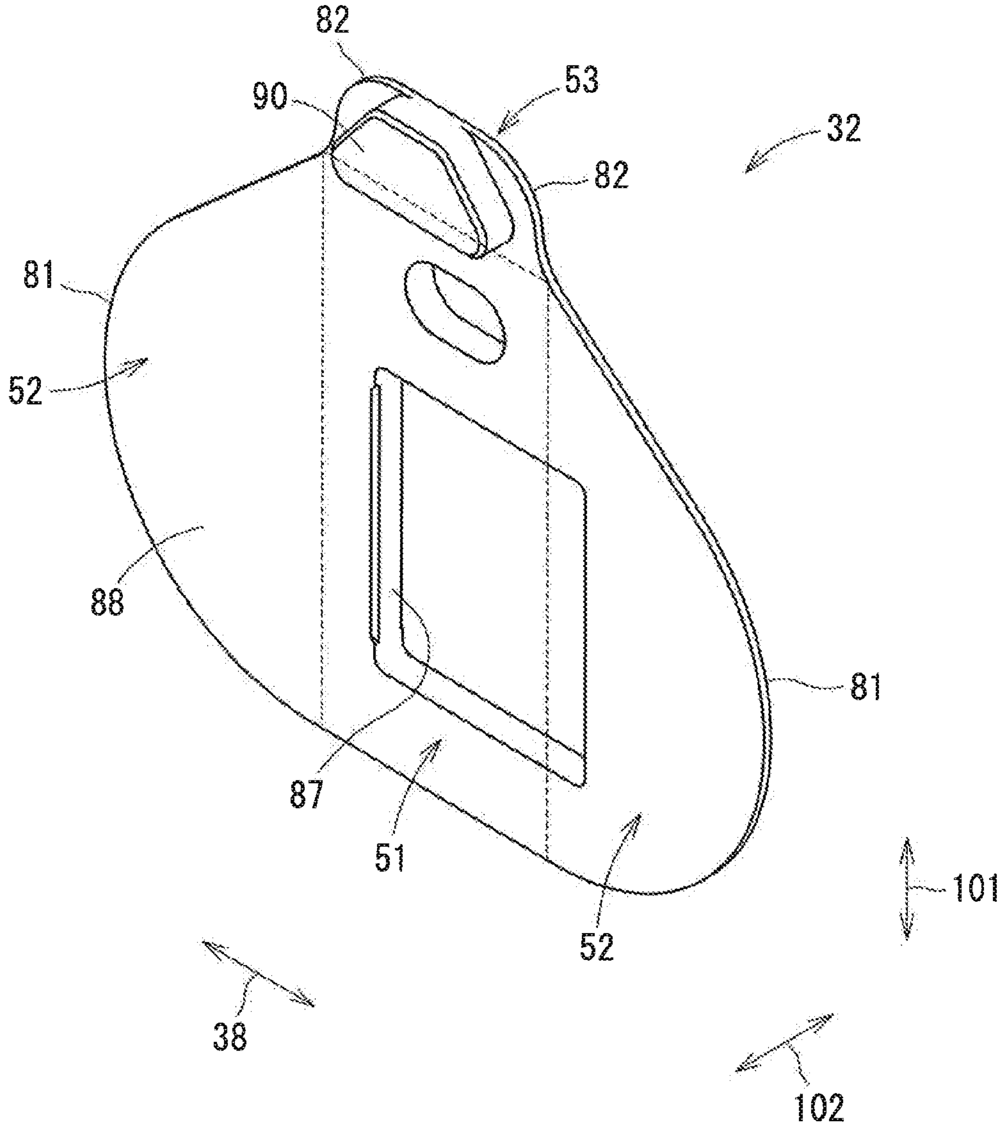
FIG. 5 is a perspective view of a fixing boss according to the embodiment of the present invention.
Figure 6:
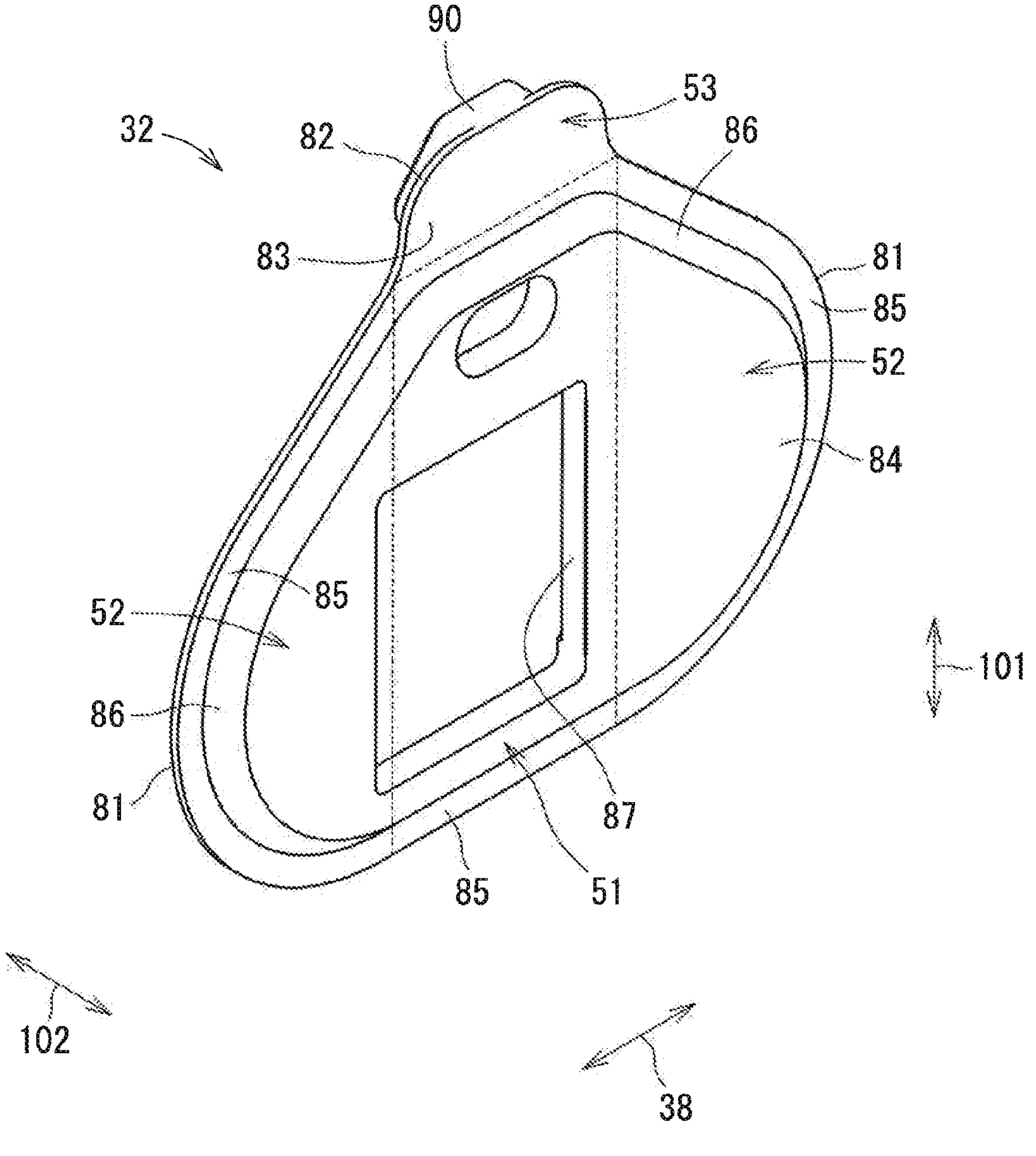
FIG. 6 is a perspective view of the fixing boss according to the embodiment of the present invention.

FIG. 5 is a perspective view of the fixing boss 32. FIG. 6 is a perspective view of the fixing boss 32 viewed from a side opposite to that of FIG. 5.

As shown in FIGS. 5 and 6, the fixing boss 32 is a plate shaped member having a predetermined thickness. The fixing boss 32 is typically made of steel material.

As shown in FIG. 5, the fixing boss 32 includes a central plate portion 51, a pair of lateral bulging portions 52, and an upper bulging portion 53 (corresponding to a "vertical bulging portion" recited in the claims). The central plate portion 51, the pair of lateral bulging portions 52, and the upper bulging portion 53 are formed integrally, and as shown in the drawing, an outer peripheral edge of the fixing boss 32 draws a smooth closed curve. Although the upper bulging portion 53 is continuous with an upper side of the central plate portion 51 in the present embodiment, the upper bulging portion 53 may be continuous with a lower side of the central plate portion 51. Furthermore, the upper bulging portion 53 may be continuous with the upper and lower sides of the central plate portion 51. Note that in FIG. 5, the central plate portion 51, the pair of lateral bulging portions 52, and the upper bulging portion 53 are separated by virtually-described broken lines.

In the following description, each direction is defined assuming that it is in a state where the fixing boss 32 is attached to each of the booms 20, 22 to 25. The central plate portion 51 has a rectangular shape extending in the longitudinal direction 38 and a vertical direction 101. Here, the vertical direction 101 is a direction orthogonal to the longitudinal direction 38 of the boom (see FIG. 1) and the width direction 102 of the boom (see FIG. 2).

The pair of lateral bulging portions 52 is provided on both sides in the longitudinal direction 38 of the central plate portion 51. The pair of lateral bulging portions 52 is located so as to sandwich the central plate portion 51 in the longitudinal direction 38. The pair of lateral bulging portions 52 is respectively continuous with the both sides in the longitudinal direction 38 of the central plate portion 51 and smoothly bulges outward. An edge surface 81 of each lateral bulging portion 52 (surface forming an outer end in the longitudinal direction 38 of each lateral bulging portion 52) is curved so as to protrude outward in the longitudinal direction 38.

The upper bulging portion 53 protrudes upward from an upper end of the central plate portion 51. The upper bulging portion 53 is continuous with the upper end of the central plate portion 51 and smoothly bulges outward (upward). An edge surface 82 of the upper bulging portion 53 is curved.

As shown in FIG. 6, a thick portion 84 is formed on a first surface 83 of the fixing boss 32. The first surface 83 bulges in the thickness direction, thereby the thick portion 84 is formed. Therefore, the thickness size of the thick portion 84 is larger than the thickness size of the remaining region. The thick portion 84 is formed in a portion except an edge portion 85 of the central plate portion 51 and the lateral bulging portion 52, and the upper bulging portion 53. A side surface 86 of the thick portion 84 is inclined. That is, a peripheral edge of the thick portion 84 is chamfered. With this, the thick portion 84 is tapered off.

As shown in FIGS. 5 and 6, the fixing boss 32 has a through hole 87. The through hole 87 penetrates the thick portion 84 of the fixing boss 32 in the thickness direction. The through hole 87 penetrates the fixing boss 32 from the first surface 83 to a second surface 88 (back surface of the first surface 83). As will be described later, the B pins 26 to 30 penetrate the through holes 87. Although the through hole 87 is provided so as to penetrate the central plate portion 51 and one of the pair of lateral bulging portions 52 in the present embodiment, the position of the through hole 87 is not limited to the position shown in FIGS. 5 and 6. For example, the through hole 87 is not formed in the pair of lateral bulging portions 52, and may be formed only in the central plate portion 51. The size and the shape of the through hole 87 only needs to correspond to the size and the shape of the B pins 26 to 30, and are not limited to the size and the shape shown in FIGS. 5 and 6.

A gap maintaining member 90 is welded to a second surface 88 side of the upper bulging portion 53. The gap maintaining member 90 has a quadrangular prism shape and protrudes from the second surface 88. The cross-sectional shape of the gap maintaining member 90 is a trapezoid. The upper base and the lower base of the trapezoidal shape extend in the longitudinal direction 38, and the upper base is shorter than the lower base.

The gap maintaining member 90 is configured by a material having hardness lower than those of the base boom 20, the top boom 21, and the intermediate booms 22 to 25. In the present embodiment, the gap maintaining member 90 is configured by gunmetal (copper alloy).

Note that the fixing boss 32 only needs to have the through hole 87 and have the gap maintaining member 90 attached, and does not necessarily have the shape and the size shown in FIGS. 5 and 6. The gap maintaining member 90 does not necessarily have the shape and the size shown in FIGS. 5 and 6, and various shapes such as a circle, a rectangle, or an ellipse can be adopted.

Figure 7:
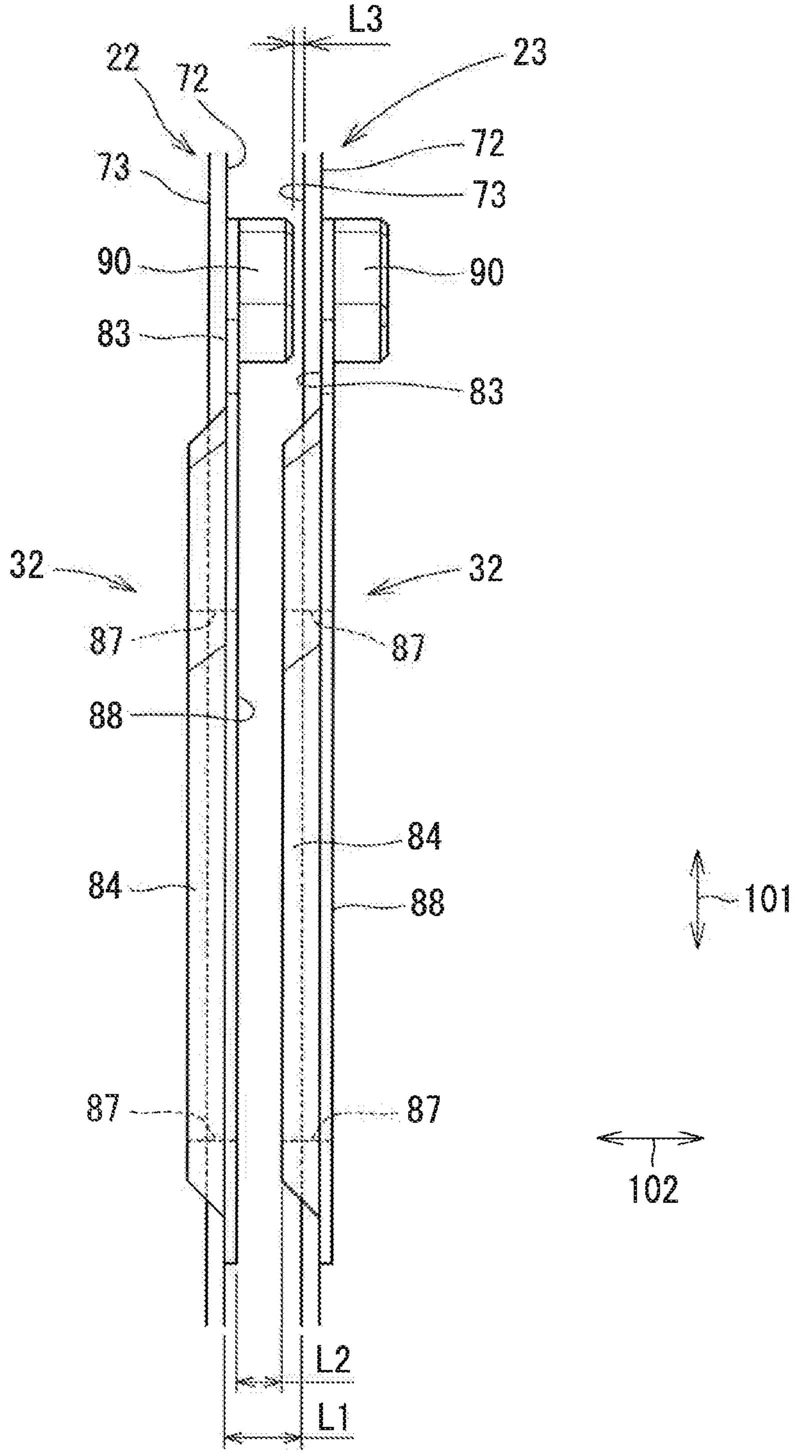
FIG. 7 is an enlarged view of a portion surrounded by a dashed line in FIG. 4.

FIG. 7 is an enlarged view of a portion surrounded by a dashed line in FIG. 4.

The drawing shows a state in which the fixing boss 32 is attached to the first intermediate boom 22. Note that since a state in which the fixing boss 33 is attached to the first intermediate boom 22 and states in which the fixing bosses 32, 33 are attached to the second intermediate boom 23, the third intermediate boom 24, the fourth intermediate boom 25, and the base boom 20 are similar to the state in which the fixing boss 32 is attached to the first intermediate boom 22, description thereof is omitted.

As shown in FIG. 2, the first intermediate boom 22 has through holes at a distal end portion and a rear end portion (regions through which the B pin 26 penetrates). As shown in FIG. 7, the fixing boss 32 is attached to the first intermediate boom 22 from the outside of a proximal end portion of the first intermediate boom 22. Specifically, the fixing boss 32 is welded to the first intermediate boom 22 in a state in which the thick portion 84 of the fixing boss 32 is inserted into the through hole.

Note that the second intermediate boom 23 and the fixing boss 32 attached to the second intermediate boom 23 are also shown in FIG. 7.

In a state in which the fixing boss 32 is welded to the first intermediate boom 22, a part of the thick portion 84 of the fixing boss 32 protrudes inward from the first intermediate boom 22. However, the part of the thick portion 84 does not necessarily have to protrude inward from the first intermediate boom 22. On the other hand, a portion of the fixing boss 32 other than the thick portion 84 abuts an outer surface 72 of the first intermediate boom 22 from the outside. At this time, the second surface 88 of the fixing boss 32 is located on the outer side (second intermediate boom 23 side) of the outer surface 72 of the first intermediate boom 22. The gap maintaining member 90 is at a position protruding outward from the fixing boss 32 (second intermediate boom 23 side). In this case, the first intermediate boom 22 corresponds to a "boom disposed outside" recited in the claims, and the second intermediate boom 23 corresponds to a "boom disposed further outside" recited in the claims.

In the drawing, an interval between the outer surface 72 of the first intermediate boom 22 and an inner surface 73 of the second intermediate boom 23 is indicated by a reference sign L1. An interval between the second surface 88 of the fixing boss 32 welded to the first intermediate boom 22 and the thick portion 84 of the fixing boss 32 welded to the second intermediate boom 23 is indicated by a reference sign L2. An interval between the gap maintaining member 90 provided on a first intermediate boom 22 side and the inner surface 73 of the second intermediate boom 23 is indicated by a reference sign L3. The interval L3 is smaller than the intervals L1, L2. With this, in such a case in which the first intermediate boom 22 slides with respect to the second intermediate boom 23, even if the first intermediate boom 22 causes a mispositioning and the outer surface 72 of the first intermediate boom 22 approaches the inner surface 73 of the second intermediate boom 23, since the gap maintaining member 90 abuts the inner surface 73, the fixing boss 32 and the first intermediate boom 22 are prevented from contacting the second intermediate boom 23. In short, the gap maintaining member 90 maintains a gap between the first intermediate boom 22 and the second intermediate boom 23.

Hereinafter, advance and retreat operations of the B pin 26 with respect to the fixing bosses 32, 33 will be described.

As shown in FIG. 2, the B pin 26 penetrates the proximal end portion and the distal end portion of the first intermediate boom 22. The fixing bosses 32, 33 through which the B pin 26 is inserted are provided at the proximal end portion and the distal end portion. The region to which the fixing boss 32 is provided is a position in which the B pin 26 faces when the top boom 21 is in a fully retracted state with respect to the first intermediate boom 22. The region to which the fixing boss 33 is provided is a position in which the B pin 26 faces when the top boom 21 is in a fully extended state with respect to the first intermediate boom 22.

At all times, the B pin 26 is biased toward the first intermediate boom 22 side by the spring not shown.

As shown in FIG. 7, the B pin 26 penetrates the through hole 87 of the fixing boss 32, thereby the top boom 21 is fixedly coupled to the first intermediate boom 22 in the fully retracted state (see FIG. 4(B)). On the other hand, the B pin 26 penetrates the through hole 87 of the fixing boss 33, thereby the top boom 21 is fixedly coupled to the first intermediate boom 22 in the fully extended state.

As shown in FIG. 4(A), the B pin 26 is pulled out from the fixing bosses 32, 33 provided to the first intermediate boom 22, by an operation of the hydraulic cylinder 31. With this, the top boom 21 is relatively slidable with respect to the first intermediate boom 22.

In this case, the top boom 21 corresponds to a "boom disposed inside" recited in the claims, and the first intermediate boom 22 corresponds to a "boom disposed outside" recited in the claims.

Note that also regarding the B pins 27 to 30, advance and retreat operations with respect to the fixing bosses 32, 33 are the same as those of the B pins 26.

As shown in FIGS. 2, 3, and 4, the cylinder boom coupling mechanism 16 includes a cylinder coupling pin (hereinafter, referred to as a "C pin") 34 and a hydraulic cylinder 35 that drives the same. The C pin 34 is provided on a cylinder tube 36 side of the telescopic cylinder 14 and is fitted to the top boom 21 in the state shown in FIG. 2.

As shown in FIG. 4, the hydraulic cylinder 35 includes a link mechanism 40. The link mechanism 40 makes the C pin 34 slide in the width direction 102 by an operation of the hydraulic cylinder 35.

At all time, the C pin 34 is biased toward a top boom 21 side by a spring not shown.

As shown in FIG. 2, a fixing boss 37 is provided at a proximal end portion of the top boom 21. As shown in FIGS. 2 and 4, the C pin 34 is fitted to the fixing boss 37. The C pin 34 is pulled toward a telescopic cylinder 14 side via the link mechanism 40 by an operation of the hydraulic cylinder 35. When the C pin 34 is pulled out from the fixing boss 37, the telescopic cylinder 14 is mechanically separated from the top boom 21. At all time, the telescopic cylinder 14 is coupled to the top boom 21, and when the hydraulic cylinder 35 operates, the telescopic cylinder 14 can slide with respect to the telescopic boom 13. The fixing boss 37 is provided also at a proximal end portion of each of the intermediate booms 22 to 25, and the C pin 34 can selectively couple to each of the intermediate booms 22 to 25 in a manner described later.

FIG. 4(A) shows a state in which the B pin 26 is pulled out from the first intermediate boom 22 and the C pin 34 is coupled to the top boom 21, and FIG. 4(B) shows a state in which the B pin 26 is coupled to the first intermediate boom 22 and the C pin 34 is pulled out from the top boom 21.

When the telescopic cylinder 14 is extended from the state of FIG. 4(A), the top boom 21 slides leftward in the longitudinal direction 38 with respect to the first intermediate boom 22 together with the cylinder tube 36 of the telescopic cylinder 14, as shown in FIG. 2. When the telescopic cylinder 14 is extended to a position in which the B pin 26 faces the fixing boss 33, the operation of the hydraulic cylinder 31 is stopped, and the B pin 26 returns to the first intermediate boom 22 side by the above-described spring and is fitted to the fixing boss 33. With this, the top boom 21 and the first intermediate boom 22 are fixed in a state in which the top boom 21 is fully extended with respect to the first intermediate boom 22. Next, as shown in FIG. 4(B), the hydraulic cylinder 35 operates, and the coupling between the C pin 34 and the top boom 21 is released via the link mechanism 40. That is, the C pin 34 is pulled out from the fixing boss 37 of the top boom 21. When the telescopic cylinder 14 is retracted in this state, only the cylinder tube 36 moves to a proximal end side of the base boom 20 (right side in FIG. 2).

Meanwhile, the hydraulic cylinder 35 continues to operate, and the C pin 34 is kept in the state of FIG. 4(B). When the telescopic cylinder 14 is retracted and the C pin 34 moves to a position of the fixing boss 37 provided to the first intermediate boom 22, the retraction operation of the telescopic cylinder 14 is stopped and the operation of the hydraulic cylinder 35 is stopped, and as shown in FIG. 4(A), the C pin 34 is coupled to the fixing boss 37 of the first intermediate boom 22. In a case in which the second intermediate boom 23 is extended, an operation similar to a case in which the top boom 21 is extended is performed, and the second intermediate boom 23, the third intermediate boom 24, and the fourth intermediate boom 25 are sequentially extended. Note that when the telescopic boom 13 is retracted, reverse operations described above are performed.

Actions and Effects of the Embodiment

According to the present embodiment, since the gap maintaining member 90 is provided to the fixing bosses 32, 33, the gap maintaining member 90 is not directly welded to the boom. In other words, among the fixing bosses 32, 33 and the gap maintaining member 90, it is only the fixing bosses 32, 33 that are welded to the boom. Therefore, an amount of welding to the boom is decreased, and welding strain generated at the time of manufacturing the boom is reduced. As a result, further thinning of the booms and a space saving of the gaps between the booms are realized, and an optimal design of the booms becomes possible. Furthermore, the gap maintaining member 90 is provided to the fixing bosses 32, 33, thereby the gap maintaining member 90 is disposed near a region in which the B pins 26 to 30 are extracted and inserted. Therefore, the gap between the booms is reliably maintained at regions in which the B pins 26 to 30 operate.

According to the present embodiment, an outer edge of the fixing boss 32 has a smooth closed curve. In other words, since the pair of lateral bulging portions 52 and the upper bulging portion 53 are smoothly continuous with the central plate portion 51, stress concentration on a specific portion is relieved. With this, the fixing boss 32 can secure a sufficient mechanical strength, and a lightweight design is also possible.

According to the present embodiment, the gap maintaining member 90 is provided to the upper bulging portion 53. Therefore, when the gap maintaining member 90 provided to the boom disposed outside contacts the boom disposed further outside, an influence of an impact or the like at the time of the contact on the central plate portion 51 and the lateral bulging portions 52 of the fixing bosses 32, 33 can be reduced.

According to the present embodiment, the gap maintaining member 90 is a quadrangular prism of which cross-sectional shape is a trapezoid. Therefore, the gap maintaining member 90 can be reduced in size by an amount in which the upper base is shorter than the lower base.

According to the present embodiment, since when the gap maintaining member 90 contacts the boom, the gap maintaining member 90 having low hardness is worn, the boom can be prevented from being worn.

According to the present embodiment, the gap maintaining member 90 is welded to the fixing bosses 32, 33, thereby the gap maintaining member 90 can be strongly attached to the fixing bosses 32, 33.

Modification Examples

Although the gap maintaining member 90 is configured by gunmetal in the above-described embodiment, the gap maintaining member 90 may be configured by a material other than gunmetal. In this case, although the gap maintaining member 90 is preferably configured by copper alloy other than gunmetal, the gap maintaining member 90 may be configured by a material other than copper alloy. For example, the gap maintaining member 90 may be of the same material as that of the fixing boss 32, or resin may be adopted.

The position at which the gap maintaining member 90 is attached to the fixing boss 32 is not limited to a part of the upper bulging portion 53. For example, the gap maintaining member 90 may be attached in the right or the left of the through hole 87 shown in FIG. 5. A plurality of gap maintaining members 90 may be attached to the fixing boss 32. For example, the gap maintaining member 90 may also be attached below the through hole 87 in addition to the position shown in FIG. 5.

The gap maintaining member 90 may be attached to the fixing boss 32 by means other than welding, for example, by fitting or bonding. The gap maintaining member 90 may be provided to the fixing boss 32 by being formed integrally with the fixing boss 32.

Figure 8:
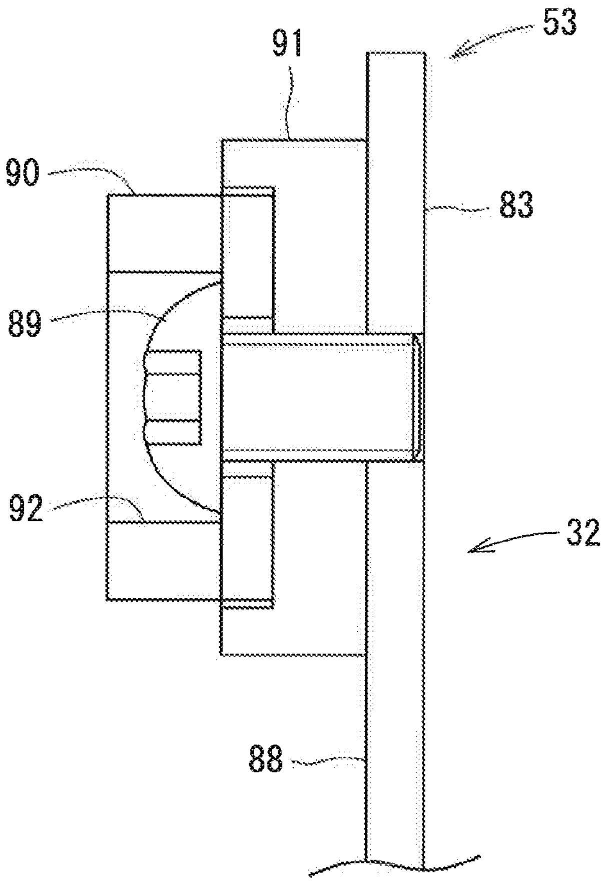
FIG. 8 is a main part enlarged cross-sectional view showing a mounting structure of a gap maintaining member according to a modification example of the embodiment of the present invention.

FIG. 8 is a main part enlarged cross-sectional view showing a mounting structure of the gap maintaining member 90 according to a modification example of the present embodiment.

As shown in the drawing, the gap maintaining member 90 may be attached to the fixing boss 32 by a bolt 89 (corresponding to a "fastening member" recited in the claims). In the present modification example, the gap maintaining member 90 is fastened to the upper bulging portion 53 of the fixing boss 32 via a seat member 91. The gap maintaining member 90 has a stepped hole 92 as shown in the drawing. The bolt 89 is inserted into the stepped hole 92 and is screwed with the upper bulging portion 53.

Since the gap maintaining member 90 is fixed by the bolt 89 in this manner, the gap maintaining member 90 is freely attachable to and detachable from the fixing boss 32. Therefore, there is an advantage that the gap maintaining member 90 is easily replaced as a consumption article.

Figure 9:
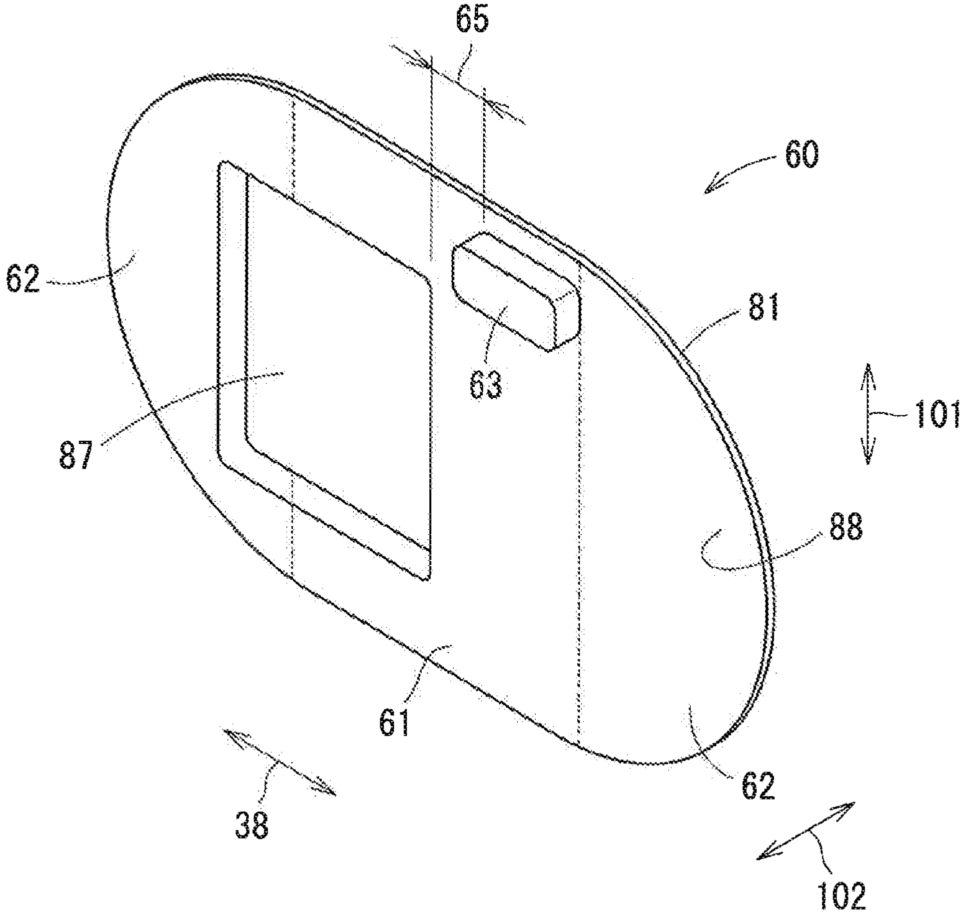
FIG. 9 is a perspective view showing a structure of a fixing boss according to a modification example of the embodiment of the present invention.
Figure 10:
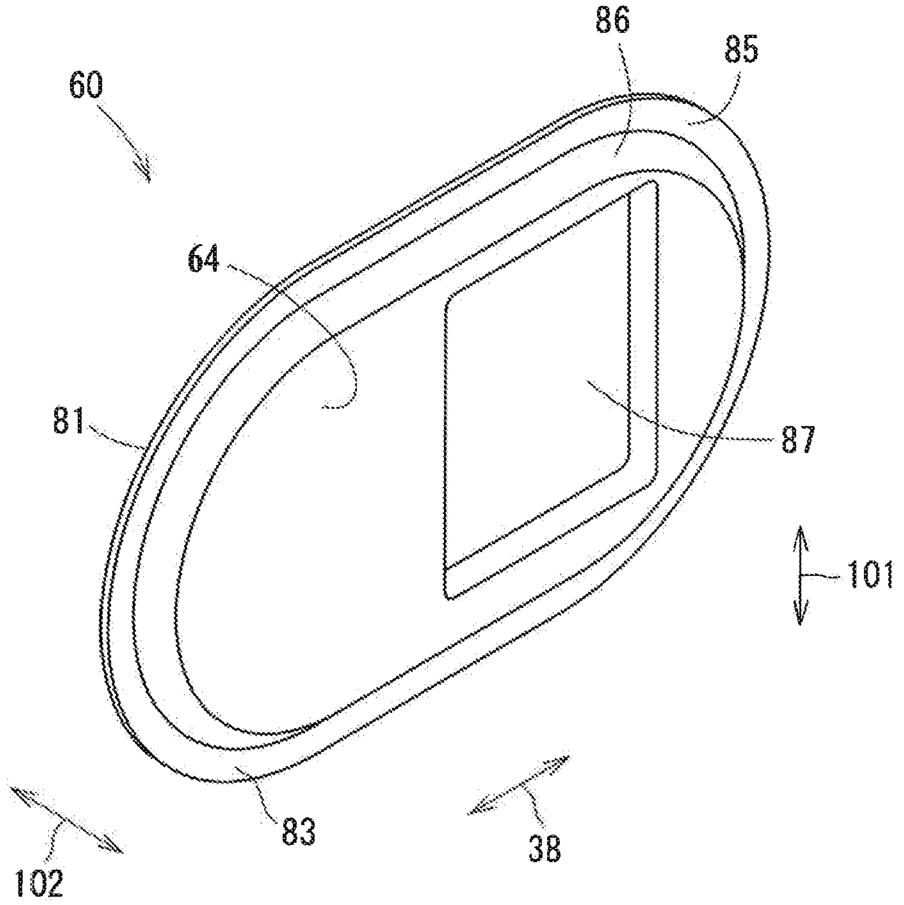
FIG. 10 is a perspective view showing the structure of the fixing boss according to the modification example of the embodiment of the present invention.

FIGS. 9 and 10 are perspective views showing a structure of a fixing boss 60 according to a modification example of the present embodiment.

The fixing boss 60 is different from the fixing boss 32 (see FIGS. 5 and 6) according to the above-described embodiment in that the fixing boss 60 does not include the upper bulging portion 53 that the fixing boss 32 includes, a central plate portion 61 has a rectangular shape of a substantially square shape, a lateral bulging portion 62 has a substantially semicircular shape, the shape of a thick portion 64 is also changed correspondingly, and the gap maintaining member 63 has a rectangular parallelepiped shape. Note that other configurations of the fixing boss 60 are similar to those of the fixing boss 32, and the same reference signs are provided.

As shown in FIGS. 9 and 10, the fixing boss 60 includes the central plate portion 61 and a pair of lateral bulging portions 62. As with the fixing boss 32, the central plate portion 61 and the pair of lateral bulging portions 62 are formed integrally. The central plate portion 61 has a rectangular shape extending in the longitudinal direction 38 and the vertical direction 101. In this modification example, the central plate portion 61 has a square shape. However, the shape of the central plate portion 61 is not limited to the square, and only needs to be a rectangle.

The shape of the pair of lateral bulging portions 62 is a semicircular shape in the present modification example. These are continuous with both sides in the longitudinal direction 38 of the central plate portion 61, and are disposed symmetrically. However, the shape of the lateral bulging portion 62 is not limited to the semicircular shape, and only needs to be a shape that smoothly bulges outward in the longitudinal direction 38 from the central plate portion 61. The edge surface 81 of each lateral bulging portion 62 is curved so as to protrude outward in the longitudinal direction 38. Note that the lateral bulging portion 62 may have a rectangular shape. In this case, the central plate portion 61 and the lateral bulging portions 62 have a rectangular shape as a whole.

As shown in FIG. 10, the thick portion 84 formed on the first surface 83 of the fixing boss 60 is formed in a portion except the edge portion 85 of the central plate portion 61 and the lateral bulging portion 62. The side surface 86 of the thick portion 64 is inclined in a manner similar to the thick portion 84 of the fixing boss 32 (see FIG. 6). The fixing boss 60 has the through hole 87, which penetrates the fixing boss 60 from the first surface 83 to the second surface 88 (back surface of the first surface 83) as with the fixing boss 32. The size and the shape of the through hole 87 are not particularly limited, and only need to correspond to the size and the shape of the B pins 26 to 30.

A gap maintaining member 63 is welded to the central plate portion 61. In the present modification example, the shape of the gap maintaining member 63 is a rectangular parallelepiped, and the gap maintaining member 63 is provided on the second surface 88. The gap maintaining member 63 is disposed at a boundary between the central plate portion 61 and the lateral bulging portion 62. However, the gap maintaining member 63 may be disposed so as to extend over the central plate portion 61 and the lateral bulging portion 63, or may be disposed in the lateral bulging portion 62. The gap maintaining member 63 is preferably disposed in a vicinity of the through hole 87, and for example, as shown in FIG. 9, a distance 65 from an edge of the through hole 87 to an edge of the gap maintaining member 62 is preferably set to 5 mm to 20 mm.

However, the shape of the gap maintaining member 63 is not limited to a rectangular parallelepiped, and the cross-sectional shape thereof may be a columnar shape such as a circle, an ellipse, or a polygon. Furthermore, the shape of the gap maintaining member 63 may correspond to the outer shape of the fixing boss 60. In other words, the outer shape of the gap maintaining member 63 may correspond to the central plate portion 61 and the lateral bulging portion 62 described above. In this case, a through hole similar to the through hole 87 is provided to the gap maintaining member 63. In the present modification example, the material composing the gap maintaining member 63 is typically gunmetal (copper alloy), and a material having hardness lower than that of the base boom 20, the top boom 21, and the intermediate booms 22 to 25 can be adopted. Note that the gap maintaining member 63 may be composed of resin.

The fixing boss 60 according to the present modification example has an advantage that the shape thereof is simple, and a further lightweight design is possible compared with the fixing boss 32 according to the above-described embodiment.

The invention claimed is:

1. A telescopic boom in which a plurality of booms forms a telescopic structure, the telescopic boom including a boom fixing mechanism configured to fix the boom disposed relatively inside at a predetermined position with respect to the boom disposed relatively outside, wherein the boom fixing mechanism comprises:

a boom fixing pin attached to the boom disposed inside and configured to advance and retreat with respect to the boom disposed outside;

a fixing boss attached to the boom disposed outside and configured to allow the boom fixing pin to be inserted and extracted; and a gap maintaining member attached to a portion of an outward facing surface of the fixing boss and configured to protrude outward to maintain a gap between the boom disposed outside and a boom disposed further outside.

2. The telescopic boom according to claim 1, wherein:

the fixing boss includes:

a central plate portion having a rectangular shape extending in a longitudinal direction and a vertical direction of the boom, the central plate portion configured to allow the boom fixing pin to be inserted and extracted;

a pair of lateral bulging portions that is respectively continuous with both sides in the longitudinal direction of the central plate portion and smoothly bulges outward; and a vertical bulging portion that smoothly bulges in a continuous manner with at least one of an upper end or a lower end of the central plate portion, and the gap maintaining member is attached to the vertical bulging portion so as to protrude to a side of the boom disposed relatively outside.

3. The telescopic boom according to claim 1, wherein:

the fixing boss includes:

a central plate portion having a rectangular shape extending in a longitudinal direction and a vertical direction of the boom, the central plate portion configured to allow the boom fixing pin to be inserted and extracted; and a pair of lateral bulging portions that is respectively continuous with both sides in the longitudinal direction of the central plate portion and symmetrically bulges outward, and the gap maintaining member is attached to the central plate portion or the lateral bulging portion and has a rectangular parallelepiped shape protruding to a side of the boom disposed relatively outside.

4. The telescopic boom according to claim 1, wherein the gap maintaining member is selectively attachable to the fixing boss by a fastening member.

5. The telescopic boom according to claim 1, wherein hardness of the gap maintaining member is lower than hardness of the boom.

6. The telescopic boom according to claim 5, wherein the boom is made of steel material, and the gap maintaining member is made of copper alloy.

7. The telescopic boom according to claim 1, wherein the gap maintaining member is welded to the fixing boss.

* * * * *